United States Patent
Zhang

(10) Patent No.: US 9,930,571 B2
(45) Date of Patent: *Mar. 27, 2018

(54) SYSTEMS AND METHODS FOR PROVIDING WLAN DATA PACKET HAVING DUAL CONFIGURATIONS

(71) Applicant: Marvell World Trade Ltd., St. Michael (BB)

(72) Inventor: Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 121 days.

This patent is subject to a terminal disclaimer.

(21) Appl. No.: 15/077,109

(22) Filed: Mar. 22, 2016

(65) Prior Publication Data

US 2016/0205590 A1    Jul. 14, 2016

Related U.S. Application Data

(63) Continuation of application No. 14/269,277, filed on May 5, 2014, now Pat. No. 9,313,691.

(Continued)

(51) Int. Cl.
*H04W 4/00* (2009.01)
*H04W 28/06* (2009.01)
(Continued)

(52) U.S. Cl.
CPC ........ *H04W 28/065* (2013.01); *H04B 7/0408* (2013.01); *H04B 7/0689* (2013.01);
(Continued)

(58) Field of Classification Search
None
See application file for complete search history.

(56) References Cited

U.S. PATENT DOCUMENTS

2006/0092892 A1    5/2006  Trachewsky
2010/0183084 A1*   7/2010  Rietman ............. H04B 7/0615
                                              375/260
(Continued)

FOREIGN PATENT DOCUMENTS

EP    2395678 A1    12/2011

OTHER PUBLICATIONS

IEEE P802.11ac™/D2.1: Draft Standard for Information Technology—Telecommunications and Information Exchange between Systems—Local and Metropolitan Area Networks—Specific Requirements, Part 11: Wireless LAN Medium Access Control (MAC) and Physical Layer (PHY) Specifications, Amendment 4: Enhancements for Very High Throughput for Operation in Bands below 6 GHz. 802.11 Working Group of the 802 Committee. (Mar. 2012): 1-338.

(Continued)

*Primary Examiner* — Chi H Pham
*Assistant Examiner* — Soon-Dong D Hyun

(57) ABSTRACT

A first wireless communication device including a network interface and a transceiver. The network interface is to transmit data from the first wireless communication device to a second wireless communication device and receive data from the second wireless communication device. The data transmitted from the first wireless communication device includes a data packet having a preamble. The preamble includes a first sub-field to indicate a transmission characteristic of the data packet, the first sub-field including a first value to indicate the transmission characteristic, and a second sub-field including a second value. The second value is to selectively indicate, based on the first value, whether to perform a first function on the data packet, and whether to perform a second function on the data packet different from the first function. The transceiver is to transmit the data (Continued)

packet from the first wireless communication device to the second wireless communication device.

20 Claims, 5 Drawing Sheets

Related U.S. Application Data

(60) Provisional application No. 61/819,292, filed on May 3, 2013.

(51) Int. Cl.
    *H04W 84/12*     (2009.01)
    *H04B 7/04*      (2017.01)
    *H04B 7/06*      (2006.01)
    *H04B 7/0408*    (2017.01)
    *H04L 25/02*     (2006.01)

(52) U.S. Cl.
    CPC ....... *H04B 7/0695* (2013.01); *H04L 25/0204* (2013.01); *H04W 84/12* (2013.01)

(56) References Cited

U.S. PATENT DOCUMENTS

| | | | |
|---|---|---|---|
| 2010/0290449 A1 | 11/2010 | van Nee et al. | |
| 2012/0269142 A1 | 10/2012 | Porat et al. | |
| 2012/0294294 A1* | 11/2012 | Zhang | H04L 1/0025 370/338 |
| 2013/0077608 A1* | 3/2013 | Amini | H04L 1/0041 370/337 |
| 2013/0170411 A1* | 7/2013 | Vermani | H04L 1/0001 370/310 |
| 2013/0235860 A1* | 9/2013 | Vermani | H04W 28/06 370/338 |
| 2013/0343211 A1 | 12/2013 | Liu et al. | |
| 2014/0029461 A1* | 1/2014 | Kinamon | H04B 7/0857 370/252 |
| 2014/0036811 A1 | 2/2014 | Zhang | |
| 2014/0229996 A1 | 8/2014 | Ellis et al. | |

OTHER PUBLICATIONS

Gunnam, Kiran, Gwan Choi, Weihuang Wang, and Mark Yeary. "Multi-Rate Layered Decoder Architecture for Block LDPC Codes of the IEEE 802.11n Wireless Standard." IEEE (2007): 1645-648. (4 pages).

De Vegt, Rolf. "Potential Compromise for 802.11ahUse Case Document." IEEE 802.11-11/0457r0. Mar. 2011. 27 pages.

Minyoung Park et al: "IEEE P802.11 Wireless LANs. Proposed Specification Framework for TGah. IEEE 802.11-11/1137r11," Sep. 19, 2012 (Sep. 19, 2012), pp. 1-36, XP055050431, Retrieved from the Internet: URL:https://mentor.ieee.org/802.11/dcn/12//11-11-1137-11-00ah-specification-framework-for-tgah.docx.

Notification of Transmittal of the International Search Report and Written Opinion for International application No. PCT/US2014/036766 dated Aug. 21, 2014, 13 pages.

* cited by examiner

SYSTEMS AND METHODS FOR PROVIDING WLAN DATA PACKET HAVING DUAL CONFIGURATIONS

CROSS-REFERENCE TO RELATED APPLICATIONS

The present disclosure is a continuation of U.S. patent application Ser. No. 14/269,277, filed on May 5, 2014, which claims the benefit of U.S. Provisional Application No. 61/819,292, filed on May 3, 2013. The entire disclosures of the applications referenced above are incorporated herein by reference.

FIELD

The present disclosure relates to mixed mode preambles in wireless local area network communication.

BACKGROUND

Wireless local area networks (WLANs) may include an access point (AP) and one or more client stations. Various operating standards for WLANs include, but are not limited to, Institute for Electrical and Electronics Engineers (IEEE) 802.11a, 802.11ac, 802.11af, 802.11ah, 802.11b, 802.11g, and 802.11n. Some standards (e.g., 802.11n, 802.11ac, and 802.11ah) implement a mixed mode preamble.

SUMMARY

A first wireless communication device includes a physical layer device configured to generate a data packet having a mixed mode preamble. The mixed mode preamble includes a first portion to be transmitted omnidirectionally via a single stream, and a second portion to be transmitted in a beamformed manner via a single stream or multiple streams. The mixed mode preamble includes a signal field corresponding to information about the data packet. The signal field includes a first sub-field that indicates a number of streams of the second portion of the mixed mode preamble and a second sub-field indicating, based on the first sub-field, whether to perform a beam change between the first portion and the second portion of the mixed mode preamble or whether to perform channel smoothing on the second portion of the mixed mode preamble. A transceiver is configured to transmit, from the first wireless communication device to a second wireless communication device, the data packet having the mixed mode preamble.

A method of operating a first wireless communication device includes generating a data packet having a mixed mode preamble. The mixed mode preamble includes a first portion to be transmitted omnidirectionally via a single stream, and a second portion to be transmitted in a beamformed manner via a single stream or multiple streams. The mixed mode preamble includes a signal field corresponding to information about the data packet. The signal field includes a first sub-field that indicates a number of streams of the second portion of the mixed mode preamble and a second sub-field indicating, based on the first sub-field, whether to perform a beam change between the first portion and the second portion of the mixed mode preamble or whether to perform channel smoothing on the second portion of the mixed mode preamble. The method further includes transmitting, from the first wireless communication device to a second wireless communication device, the data packet having the mixed mode preamble.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
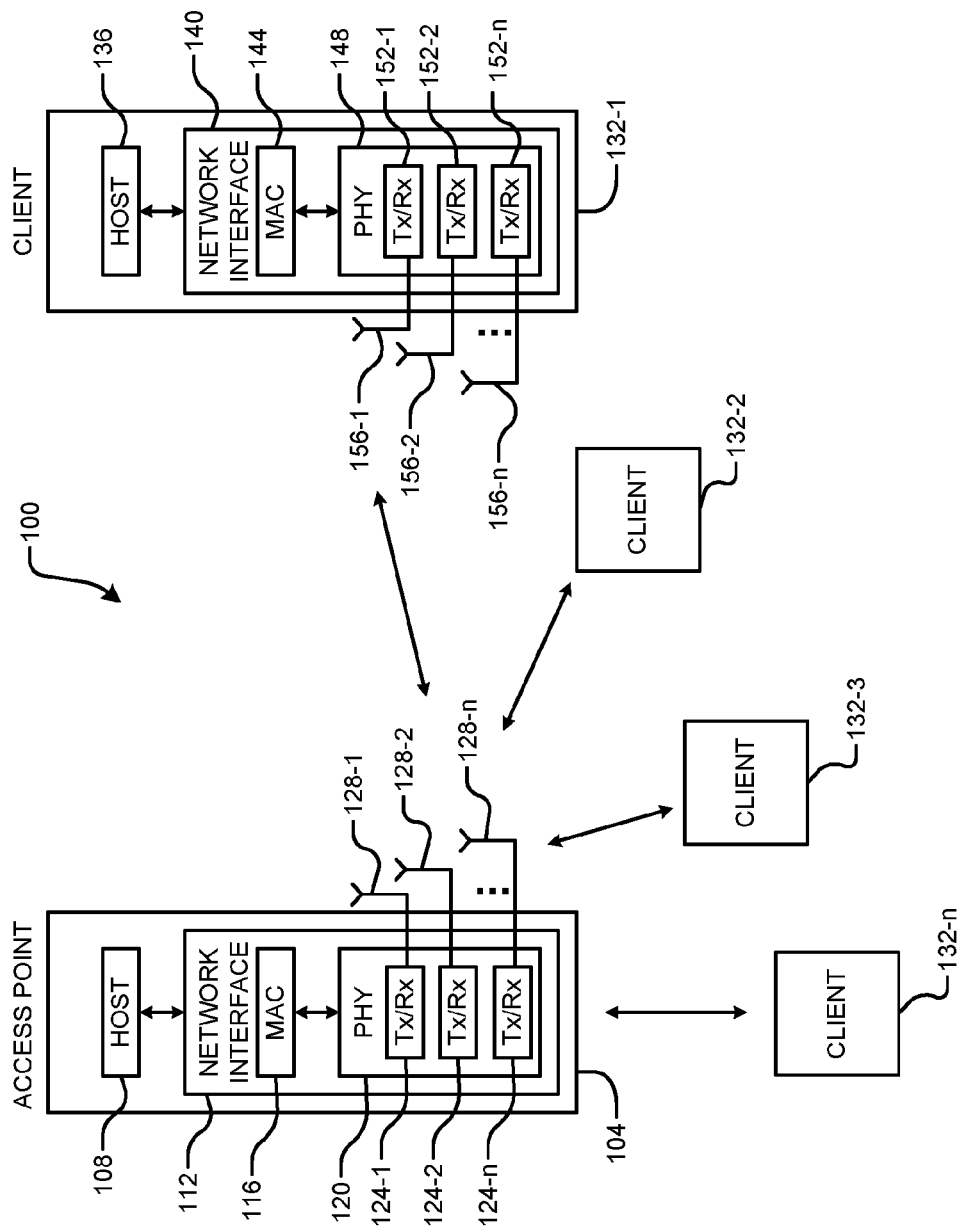
FIG. 1 is an example wireless local area network including one or more devices configured to implement mixed mode preamble beam change and smoothing according to an embodiment of the present disclosure.

Various IEEE 802.11 standards, such as IEEE 802.11n, 802.11ac, and 802.11ah implement a mixed mode preamble (e.g., referred to as a "long preamble" in IEEE 802.11ah). The mixed mode preamble includes a first portion (referred to herein also as "omni portion") that is to be transmitted omnidirectionally using a single stream and a second portion (also referred to herein as "beamformed portion") that is transmitted in a beamformed manner using multiple streams. Specifically, mixed mode preambles include an omni portion to support multi-user multiple-input multiple-output (MU-MIMO) operation. For example only, the omni portion includes a short training field (STF), a first long training field (LTF or LTF1), and a physical layer (PHY) signal field (SIG or SIG-A). The SIG-A field includes information about (e.g., how to process) the beamformed portion corresponding to the mixed mode preamble, and may be modulated according to a binary phase-shift keying (BPSK) modulation scheme and/or a quadrature phase-shift keying (QPSK) modulation scheme. The beamformed portion of the mixed mode preamble follows the SIG field. Some omni portions (e.g., IEEE 802.11ac omni portions) include a legacy signal field (e.g., between LTF and SIG-A). The LTF may include double guard interval (DGI) and one or more long training sequences (LTS).

The SIG field in the omni portion of the mixed mode preamble (SIG-A) includes an $N_{STS}$ indication. $N_{STS}$ indicates a number of streams (e.g., corresponding to a number of transmit antennas) of the beamformed portion being transmitted from the device. For example, if $N_{STS}=1$, only a single stream is being transmitted. Conversely, if $N_{STS}>1$, multiple ($N_{TX}$) transmit antennas will transmit the beamformed portion.

Regardless whether $N_{STS}>1$ (i.e., whether multiple transmit antennas will be used to transmit the beamformed portion), the omni portion is still transmitted via a single spatial stream (e.g., the omni portion may be modulated similar to legacy wireless local area network (WLAN) standards such as 802.11a, 802.11g, etc.), and is mapped to $N_{TX}$ transmit antennas by a spatial mapping matrix $Q_k^{(omni)}$ for a k-th tone according to $x_k = Q_k^{(omni)} s_k$, where $x_k$ corresponds to the transmitted vector in tone k, of size $N_{TX} \times 1$, $Q_k^{(omni)}$ corresponds to the spatial mapping matrix for the omni portion in tone k, of size $N_{TX} \times 1$, and $s_k$ corresponds to an original single stream signal in tone k, of size $1 \times 1$.

Conversely, the beamformed portion may be modulated with $N_{STS}$ space-time streams (i.e., MIMO) and mapped to NTX transmit antennas by spatial mapping matrix $Q_k^{(data)}$ for the k-th tone according to $x_k = Q_k^{(data)} D_{CSD,k} s_k$, where where $x_k$ corresponds to the transmitted vector in tone k, of size $N_{TX} \times 1$, $Q_k^{(data)}$ corresponds to the spatial mapping matrix for the beamformed portion in tone k, of size $N_{TX} \times N_{STS}$, $D_{CSD,k}$ corresponds to the diagonal matrix with diagonal values representing per-stream cyclic shift diversity (CSD) phase shiftings in tone k, of size $N_{STS} \times N_{STS}$ and $s_k$ corresponds an original single or multi-stream signal in tone k, of size $N_{STS} \times 1$ Systems and methods according to the principles of the present disclosure provide an additional bit (in embodiments, one or more bits) in the SIG-A field of the omni portion. For example, this additional bit may be referred to as a "beam-change/smoothing" (bc/s) bit. For reference, the terms "smoothing" and "beamforming" correspond to usage in, for example, standards 802.11n, 802.11ac, etc. The term "beam change" corresponds to a beam change indication.

In one embodiment, a receiving device (i.e., a device that receives the signal including the omni portion of the mixed mode preamble) interprets the bc/s bit differently according to other values in the SIG-A field. For example, in such an embodiment, the receiving device interprets the bc/s bit differently based on the value of $N_{STS}$. In other words, the value of the bc/s bit (e.g., a 1 or a 0) may provide more than one indication to the receiver in different circumstances. For example, a 1 or 0 in the bc/s bit field may correspond to a recommendation, to the receiver, of whether to perform a beam change (1) or not (0) if $N_{STS}=1$. Conversely, a 1 or 0 in the bc/s bit field may recommend, to the receiver, whether to perform smoothing (1) or not (0) if $N_{STS} > 1$. In other words, the number of space-time streams ($N_{STS}$) to be used to carry the beamformed portion of the same packet controls the interpretation of the bc/s bit. Accordingly, the bc/s bit may both indicate a change between use of the $Q_k^{(omni)}$ and $Q_k^{(data)}$ matrices, as well as the smoothability of the beamformed portion channel estimation (e.g., based on data long training fields, or D-LTF (1 . . . N), in the beamformed portion).

FIG. 1 shows an example WLAN 100 including one or more wireless communication devices configured to implement the mixed mode preamble beam change and smoothing systems and methods according to an embodiment of the present disclosure. The WLAN 100 includes an access point (AP) 104 having a host processor 108 in communication with a network interface 112. The network interface 112 includes a medium access control (MAC) device 116 and a physical layer (PHY) device 120. The PHY device 120 includes a plurality of transceivers 124-1, 124-2, . . . , and 124-n, referred to collectively as transceivers 124. The transceivers 124 communicate with respective antennas 128-1, 128-2, . . . , and 128-n, referred to collectively as antennas 128.

The AP 104 communicates with a plurality of client stations 132-1, 132-2, 132-3, . . . , and 132-n, referred to collectively as client stations 132. The client station 132-1 includes a host processor 136 in communication with a network interface 140. The network interface 140 includes a MAC device 144 and a PHY device 148. The PHY device 148 includes a plurality of transceivers 152-1, 152-2, . . . , and 152-n, referred to collectively as transceivers 152. The transceivers 152 communicate with respective antennas 156-1, 156-2, . . . , and 156-n, referred to collectively as antennas 128. One or more of the client stations 132 may have a same or similar structure as the client station 132-1. For example only, each of the client stations 132 may have a same or different number of the transceivers 152 and the antennas 156.

The host processor 108, the MAC device 144, and/or the PHY device 120 of the AP 104 may be configured to generate data packets including the mixed mode preamble according to the principles of the present disclosure. Accordingly, the mixed mode preamble includes an omni portion and a beamformed portion. For example, the SIG-A field of the omni portion includes an additional beam-change/smoothing (bc/s) bit. The bc/s bit indicates whether beam change or smoothing is recommended based on a value of $N_{STS}$. The transceivers 124 are configured to transmit the data packets via the respective antennas 128.

Conversely, respective receiving devices (i.e., the client stations 132) are configured to selectively process the data packets received from the AP 104, via antennas 156, according to the bc/s bit in the mixed mode preamble.

For example, $Q_k^{(omni)}$ may be equal to $Q_k^{(data)}$ (i.e., the spatial mapping between the omni portion and the beamformed portion may be the same) when the beamformed portion is modulated as a single space-time stream (i.e., when $N_{STS}=1$). In other words, because the omni portion is always modulated as a single space time stream, $Q_k^{(omni)}$ may be equal to $Q_k^{(data)}$ when the beamformed portion is modulated, like the omni portion, as a single space-time stream. However, when $N_{STS}=1$, the spatial mapping between the omni portion and the beamformed portion may be the same or different. For example, the spatial mapping between the omni portion and the beamformed portion may be different if beamforming is performed. Accordingly, if $N_{STS}=1$, then the bc/s bit is set (e.g., to 1) to instruct the receiving device to perform a beam change if the spatial mapping between the omni portion and the beamformed portion is different. Conversely, if $N_{STS}=1$ and the spatial mapping between the omni portion and the beamformed portion is the same, then the bc/s is not set (e.g., set to 0).

Accordingly, when $N_{STS}=1$, the bc/s bit indicates to the receiving device when to transition between the spatial mapping of the omni portion, $Q_k^{(omni)}$, and the spatial mapping of the beamformed portion, $Q_k^{(data)}$. Setting the bc/s bit to 1 indicates that $Q_k^{(omni)}$ is not equal to $Q_k^{(data)}$ for at least one of the overlapping non-zero tones between the omni portion and the beamformed portion, and therefore the receiving device should perform a beam change. Further, the bc/s bit being set to 1 may also indicate a recommendation for the receiving device not to conduct channel smoothing across adjacent tones for the beamformed portion channel estimations. For example, when bc/s=1, the transmitting device may be performing transmit beamforming (TxBF) on the beamformed portion, and performing smoothing in this situation may degrade performance.

Conversely, not setting the bc/s bit (i.e., setting the bc/s bit to 0) when $N_{STS}=1$ indicates a recommendation for the receiving device not to perform a beam change between the omni portion and the beamformed portion. In some implementations (e.g., for an 802.11ah long preamble), when the beam is not changed, the receiving device may combine channel estimations of LTF1 of the omni portion and D-LTF1 of the beamformed portion.

When $N_{STS}>1$, the bc/s bit indicates to the receiving device whether channel smoothing is recommended. For example, when $N_{STS}>1$ and the bc/s bit is set (i.e., set to 1), it is recommended for the receiving device to perform channel smoothing on the beamformed portion. When $N_{STS}>1$ and the bc/s bit is not set (i.e., set to 0), it is recommended for the receiving device to not perform channel smoothing on the beamformed portion. In some implementations, when $N_{STS}>1$, the bc/s bit may be used to indicate whether to perform beamforming.

Figure 2:
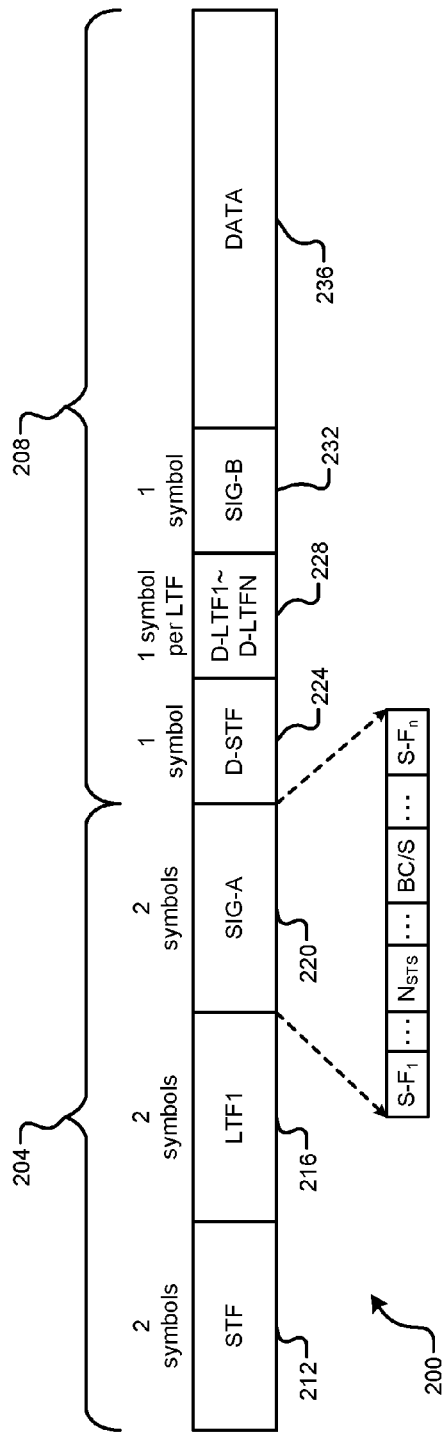
FIG. 2 is an example mixed mode preamble according to an embodiment of the present disclosure.

FIG. 2 shows an example mixed mode preamble 200 generated and transmitted by a transmitting device (e.g., the AP 104 of FIG. 1) and received by a receiving device (e.g., one of the client stations 132 of FIG. 1) according to an embodiment of the present disclosure. The preamble 200 includes an omni portion 204 and a beamformed portion 208. The omni portion 204 includes an STF 212, an LTF1 216, and a PHY SIG-A 220. The beamformed portion 208 includes a beamformed portion short training field (D-STF) 224, D-LTF1 ... DTFN 228, a PHY SIG-B 232, and data 236.

The SIG-A field 220 includes a plurality of sub-fields 240 (S-F$_1$ ... S-F$_n$). The sub-fields 240 include an $N_{STS}$ field and a bc/s field (bit). The transmitting device selectively sets the bc/s bit as described above according to an embodiment of the present disclosure. The receiving device interprets the bc/s bit based on the value of the $N_{STS}$ field.

Figure 3:
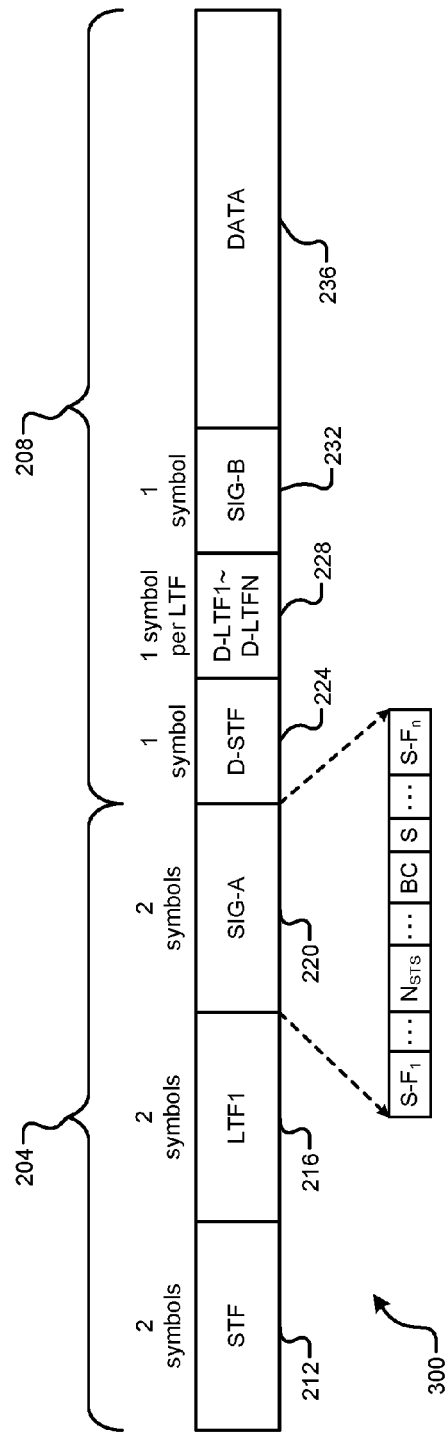
FIG. 3 is another example mixed mode preamble according to an embodiment of the present disclosure.

FIG. 3 shows another example mixed mode preamble 300 generated and transmitted by a transmitting device (e.g., the AP 104 of FIG. 1) and received by a receiving device (e.g., one of the client stations 132 of FIG. 1) according to an embodiment of the present disclosure. Instead of a single bc/s bit, the SIG-A field 220 of the preamble 300 includes a beam change (bc) bit and a smoothing (or, in some implementations, beamforming) bit s. In other words, instead of using a single beam-change/smoothing bit, the SIG-A field 220 includes separate bc and s bits. Accordingly, regardless of whether $N_{STS}$ is greater than 1, the bc bit indicates whether to perform a beam change. For example, when $N_{STS}>1$, the bc bit is set to 1. Conversely, the s bit indicates whether to perform smoothing (or, in some implementations whether to perform beamforming).

Figure 4:
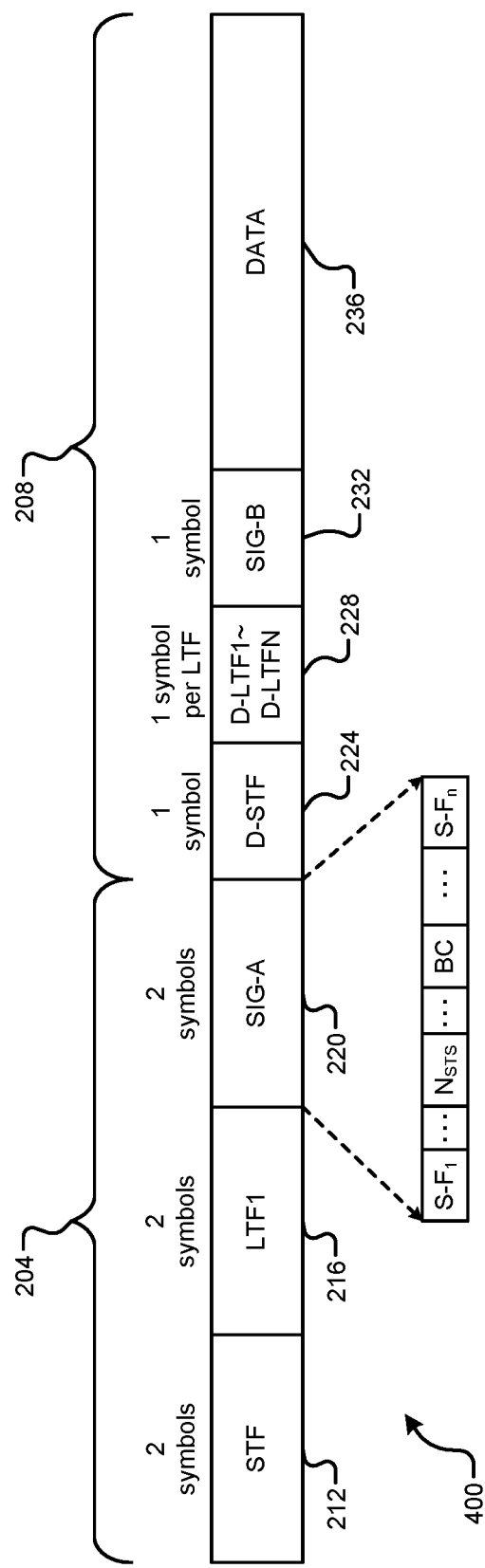
FIG. 4 is another example mixed mode preamble according to an embodiment of the present disclosure.

FIG. 4 shows another example mixed mode preamble 400 generated and transmitted by a transmitting device (e.g., the AP 104 of FIG. 1) and received by a receiving device (e.g., one of the client stations 132 of FIG. 1) according to an embodiment of the present disclosure. The SIG-A field 220 of the preamble 400 includes a beam change bit bc. Accordingly, bc indicates whether to perform a beam change regardless of whether $N_{STS}$ is greater than 1. If $N_{STS}$ is greater than 1, than the value of bc will also be 1 to indicate that a beam change should be performed.

In some implementations, the mixed mode preamble may include only the additional bc bit as shown in FIG. 4, which is set to indicate that a beam change should be performed by the receiving device, and not set to indicate that a beam change should not be performed by the receiving device. However, the interpretation of the bc bit by the receiving device may vary depending on whether $N_{STS}$ is 1 or greater than 1.

For example, if $N_{STS}$ is 1, indicating a single space-time stream, and bc is set to 1, then $Q_k^{(omni)}$ is not equal to $Q_k^{(data)}$ for at least one of the overlapping non-zero tones between the omni portion and the beamformed portion. Accordingly, bc being set to 1 also indicates a recommendation that the receiving device should not perform channel smoothing across adjacent tones for the beamformed portion channel estimations due to the likelihood that the transmitting device is performing transmission beam forming T×BF on the beamformed portion. Conversely, if $N_{STS}$ is 1 and bc is set to 0, then $Q_k^{(omni)}$ is equal to $Q_k^{(omni)}$ in all of the overlapping non-zero tones between the omni portion and the beamformed portion.

If $N_{STS}$ is greater than one, indicating more than one space-time stream, and bc is set to 1, $Q_k^{(omni)}$ is different from the corresponding spatial mapping matrix for D-LTF1. In other words, $Q_k^{(omni)}$ is not equal to $Q_k^{(omni)}D_k^{(CSD)}P_1$ for at least one of the overlapping non-zero tones between the omni portion and the beamformed portion, where $P_1$ corresponds to a first column of a spreading P matrix. Accordingly, LTF1 and D-LTF1 are spatially mapped differently (for example, as a result of beamforming or different spatial mapping in the beamformed portion). Further, regardless of whether beamforming is being performed, it is recommended that channel smoothing is not performed by the receiving device when bc is set to 1. In some implementations, an additional smoothing bit s may be used to indicate whether channel smoothing should be performed.

If $N_{STS}$ is greater than one, indicating more than one space-time stream, and bc is not set (i.e., is set to 0), then $Q_k^{(omni)}$ is equal to $Q_k^{(omni)}D_k^{(CSD)}P_1$ for all of the overlapping non-zero tones between the omni portion and the beamformed portion. For example, for multiple space-time streams, multi-streams in each data packet are trained using the D-LTFs as spread by the P matrix according to [DLTF$_1$, DLTF$_2$, ... DLTF$_{N_{LTF}}$]$Q_k^{(data)}D_k^{CSD}P_{LTF}$LTF$_k$, where $Q_k^{(data)}$ corresponds to a spatial mapping matrix for multi-streams of size $N_{TX} \times N_{STS}$, $D_k^{CSD}$ corresponds to a diagonal matrix reflecting phase shifts on different streams caused by per-stream CSD, $P_{LTF}$ corresponds to the spreading P matrix of size $N_{STS} \times N_{LTF}$, and LTF$_k$ corresponds to an LTF sign (1 or -1) in tone k, of size 1×1. Accordingly, if $N_{STS}$ is greater than one, indicating more than one space-time stream, and bc is not set, then $Q_k^{(omni)}$ is equal to $Q_k^{(data)}D_k^{(CSD)}P_1$. In other words, the spatial mapping for LTF1 and the spatial mapping for D-LTF1 are the same, and the receiving device may combine LTF1 with D-LTF1 to improve channel estimations.

Figure 5:
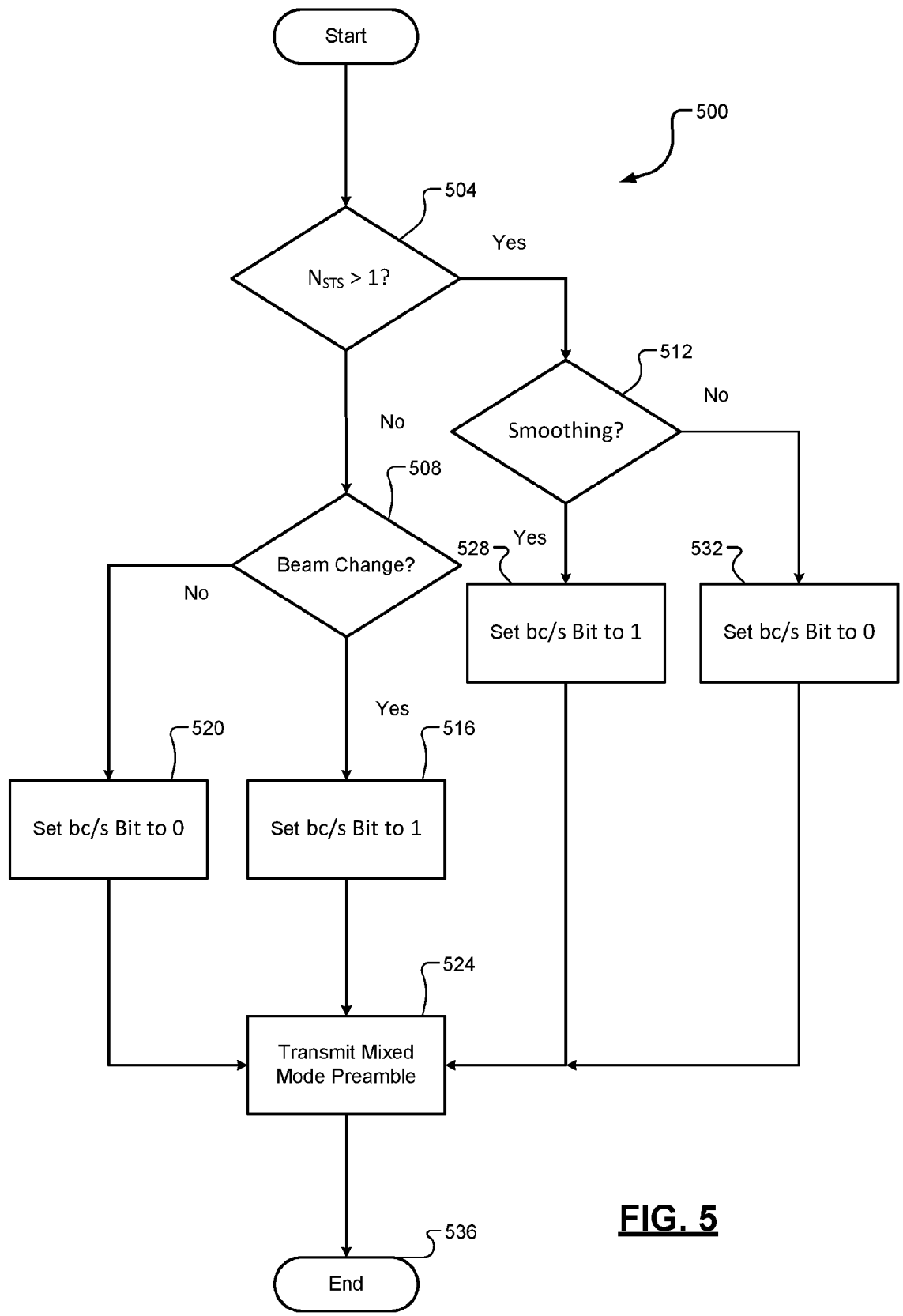
FIG. 5 is an example mixed mode preamble beam change and smoothing method performed by a transmitting device according to an embodiment of the present disclosure.

FIG. 5 shows an example mixed mode preamble beam change and smoothing method 500 as performed by a transmitting device according to an embodiment of the present disclosure. At 504, the method 500 determines whether a number of space-time streams $N_{STS}$ is greater than 1. If false, the method 500 continues to 508. If true, the method 500 continues to 512. At 508, the method 500 determines whether to indicate a recommendation, to a receiving device, to perform a beam change between an omni portion and a beamformed portion. If true, the method 500 continues to 516. If false, the method 500 continues to 520. At 516, the method 500 sets a bc/s bit in the SIG-A field of a mixed mode preamble to 1. At 520, the method 500 sets the bc/s bit to 0. At 524, the transmitting device transmits the mixed mode preamble including an $N_{STS}$ field indicating the number of space-time streams to be used for transmitting the beamformed portion and the bc/s bit.

At 512, the method 500 determines whether to indicate a recommendation, to the receiving device, to perform channel smoothing on the beamformed portion. If true, the method 500 continues to 528. If false, the method 500 continues to 532. At 528, the method 500 sets the bc/s bit to 1. At 532, the method 500 sets the bc/s bit to 0. The method 500 then transmits the mixed mode preamble at 524 and ends at 536.

Figure 6:
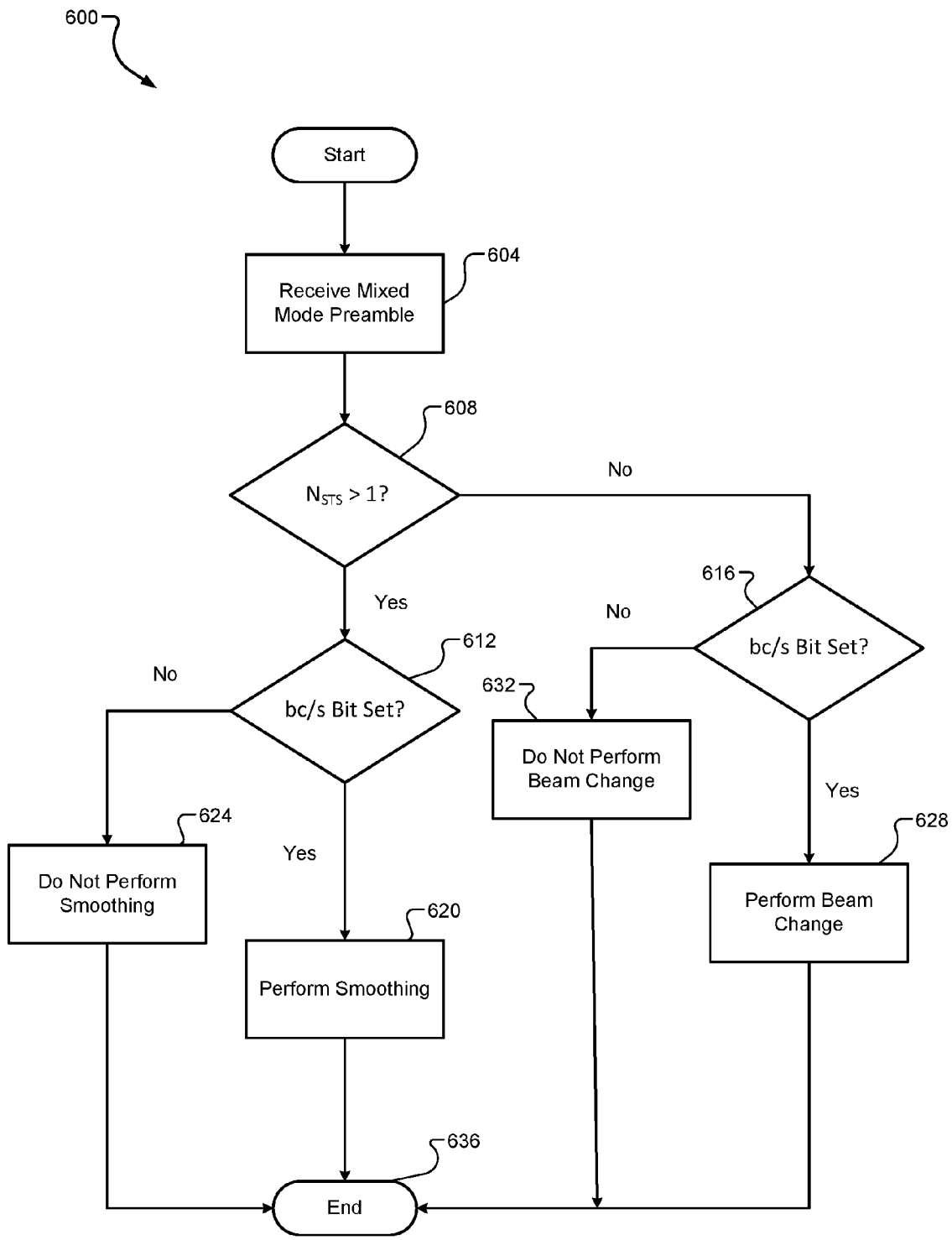
FIG. 6 is an example mixed mode preamble beam change and smoothing method performed by a receiving device according to an embodiment of the present disclosure.

FIG. 6 shows an example mixed mode preamble beam change and smoothing method 600 as performed by a receiving device according to an embodiment of the present disclosure. At 604, the method 600 receives a mixed mode preamble of a data packet. At 608, the method 600 determines, based on an $N_{STS}$ sub field in a SIG-A field of an omni portion of the mixed mode preamble, a number of space-time streams $N_{STS}$ being used to transmit a beamformed portion of the mixed mode preamble and determines whether $N_{STS}$ is greater than 1. If true, the method 600 continues to 612. If false, the method 600 continues to 616.

At 612, the method 600 determines whether the bc/s bit in the SIG-A field is set. If true, the method 600 continues to 620. If false, the method 600 continues to 624. At 620, the method 600 performs channel smoothing on the beamformed portion of the mixed mode preamble. At 624, the method 600 processes the beamformed portion of the mixed mode preamble without performing channel smoothing.

At 616, the method 600 determines whether the bc/s bit in the SIG-A field is set. If true, the method 600 continues to 628. If false, the method 600 continues to 632. At 628, the method 600 performs a beam change between the omni portion and the beamformed portion. In some implementations, the method 600 performs the beam change but does not perform channel smoothing. At 632, the method 600 processes the beamformed portion of the mixed mode preamble without performing a beam change. The method 600 ends at 636.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

Further aspects of the present disclosure relates to one or more of the following clauses. A first wireless communication device includes a physical layer device configured to generate a data packet having a mixed mode preamble. The mixed mode preamble includes a first portion to be transmitted omnidirectionally via a single stream, and a second portion to be transmitted in a beamformed manner via a single stream or multiple streams. The mixed mode preamble includes a signal field corresponding to information about the data packet. The signal field includes a first sub-field that indicates a number of streams of the second portion of the mixed mode preamble and a second sub-field indicating, based on the first sub-field, whether to perform a beam change between the first portion and the second portion of the mixed mode preamble or whether to perform channel smoothing on the second portion of the mixed mode preamble. A transceiver is configured to transmit, from the first wireless communication device to a second wireless communication device, the data packet having the mixed mode preamble.

The second sub-field is a single bit. The first sub-field includes a value $N_{STS}$ indicating the number of streams of the second portion to be transmitted. The second sub-field indicates whether to perform the beam change between the first portion and the second portion of the mixed mode preamble if the number of streams of the second portion to be transmitted is one. If the number of streams of the second portion to be transmitted is one, the second sub-field has a first value to indicate a recommendation, to the second wireless communication device, to perform the beam change between the first portion and the second portion of the mixed mode preamble and a second value to indicate a recommendation, to the second wireless communication device, not to perform the beam change between the first portion and the second portion of the mixed mode preamble.

The second sub-field indicates whether to perform the channel smoothing on the second portion of the mixed mode preamble if the number of streams of the second portion to be transmitted is greater than one. If the number of streams of the second portion to be transmitted is greater than one, the second sub-field has a first value to indicate a recommendation, to the second wireless communication device, to perform the channel smoothing on the second portion of the mixed mode preamble and a second value to indicate a recommendation, to the second wireless communication device, not to perform the channel smoothing on the second portion of the mixed mode preamble.

A system includes the first wireless communication device of claim and the second wireless communication device. The second wireless communication device is configured to receive the mixed mode preamble from the first wireless communication device, determine, based on the first sub-field, a number of streams of the second portion of the mixed mode preamble to be transmitted by the first wireless communication device, and determine, based on the number of streams of the second portion of the mixed mode preamble that will be transmitted by the first wireless communication device and the second sub-field, whether to perform the beam change between the first portion and the second portion or whether to perform the channel smoothing on the second portion. The second wireless communication device is configured to determine whether to perform the beam change on the second portion of the mixed mode preamble if the number of streams of the second portion to be transmitted is one. The second wireless communication device is configured to determine whether to perform the channel smoothing if the number of streams of the second portion to be transmitted is greater than one.

A method of operating a first wireless communication device includes generating a data packet having a mixed mode preamble. The mixed mode preamble includes a first portion to be transmitted omnidirectionally via a single stream, and a second portion to be transmitted in a beamformed manner via a single stream or multiple streams. The mixed mode preamble includes a signal field corresponding to information about the data packet. The signal field includes a first sub-field that indicates a number of streams of the second portion of the mixed mode preamble and a second sub-field indicating, based on the first sub-field, whether to perform a beam change between the first portion and the second portion of the mixed mode preamble or whether to perform channel smoothing on the second portion of the mixed mode preamble. The method further includes transmitting, from the first wireless communication device to a second wireless communication device, the data packet having the mixed mode preamble.

The second sub-field is a single bit. The first sub-field includes a value $N_{STS}$ indicating the number of streams of the second portion to be transmitted. The second sub-field indicates whether to perform the beam change between the first portion and the second portion of the mixed mode preamble if the number of streams of the second portion to be transmitted is one. If the number of streams of the second portion to be transmitted is one, the second sub-field has a first value to indicate a recommendation, to the second wireless communication device, to perform the beam change between the first portion and the second portion of the mixed mode preamble and a second value to indicate a recommendation, to the second wireless communication device, not to perform the beam change between the first portion and the second portion of the mixed mode preamble.

The second sub-field indicates whether to perform the channel smoothing on the second portion of the mixed mode preamble if the number of streams of the second portion to be transmitted is greater than one. If the number of streams of the second portion to be transmitted is greater than one, the second sub-field has a first value to indicate a recommendation, to the second wireless communication device, to perform the channel smoothing on the second portion of the mixed mode preamble and a second value to indicate a recommendation, to the second wireless communication device, not to perform the channel smoothing on the second portion of the mixed mode preamble.

The method further includes, using the second wireless communication device, receiving the mixed mode preamble from the first wireless communication device, determining, based on the first sub-field, a number of streams of the second portion of the mixed mode preamble to be transmitted by the first wireless communication device, and determining, based on the number of streams of the second portion of the mixed mode preamble that will be transmitted by the first wireless communication device and the second sub-field, whether to perform the beam change between the first portion and the second portion or whether to perform the channel smoothing on the second portion. The method further includes, using the second wireless communication device, determining whether to perform the beam change on the second portion of the mixed mode preamble if the number of streams of the second portion to be transmitted is one. The method further includes, using the second wireless communication device, determining whether to perform the channel smoothing if the number of streams of the second portion to be transmitted is greater than one.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering an embodiment of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A first wireless communication device, comprising:
    a network interface to (i) transmit data from the first wireless communication device to a second wireless communication device, and (ii) receive data from the second wireless communication device, wherein
        the data transmitted from the first wireless communication device includes a data packet having a preamble, and
        the preamble includes (i) a first sub-field to indicate a transmission characteristic of the data packet, the first sub-field including a first value to indicate the transmission characteristic, and (ii) a second sub-field including a second value, wherein the second value is to selectively indicate, based on the first value, each of
            whether to perform a first function on the data packet, and
            whether to perform a second function on the data packet different from the first function; and
    a transceiver to transmit the data packet having the preamble from the first wireless communication device to the second wireless communication device.

2. The first wireless communication device of claim 1, wherein:
    the preamble corresponds to a mixed mode preamble; and
    the network interface is further to (i) transmit a first portion of the mixed mode preamble omnidirectionally in a single stream, and (ii) transmit a second portion of the mixed mode preamble in a beamformed manner in a single stream or in multiple streams.

3. The first wireless communication device of claim 1, wherein the first function corresponds to a beam change between a first portion of the preamble and a second portion of the preamble.

4. The first wireless communication device of claim 1, wherein the second function corresponds to channel smoothing.

5. The first wireless communication device of claim 1, wherein the first value indicates a number of streams in a portion of the preamble to be transmitted from the first wireless communication device.

6. The first wireless communication device of claim 5, wherein the second value indicates whether to perform the first function if the number of streams indicated by the first value is one.

7. The first wireless communication device of claim 6, wherein, if the number of streams indicated by the first value is one, the second value indicates a recommendation, to the second wireless communication device, to one of (i) perform the first function on the data packet and (ii) not perform the first function on the data packet.

8. The first wireless communication device of claim 5, wherein the second value indicates whether to perform the second function if the number of streams indicated by the second value is greater than one.

9. The first wireless communication device of claim 8, wherein, if the number of streams indicated by the second value is greater than one, the second value indicates a recommendation, to the second wireless communication device, to one of (i) perform the second function on the data packet and (ii) not perform the second function on the data packet.

10. A system, comprising:
the first wireless communication device of claim 1; and
the second wireless communication device, the second wireless communication device to
receive the data packet including the preamble from the first wireless communication device, and
determine, based on the first value in the first sub-field of the preamble, whether to (i) perform the first function on the data packet or (ii) perform the second function on the data packet.

11. A method for operating a first wireless communication device, the method comprising:
transmitting data from the first wireless communication device to a second wireless communication device;
receiving data from the second wireless communication device;
providing, in the data transmitted from the first wireless communication device, a data packet having a preamble, wherein
the preamble includes (i) a first sub-field to indicate a transmission characteristic of the data packet, the first sub-field including a first value to indicate the transmission characteristic, and (ii) a second sub-field including a second value, wherein the second value is to selectively indicate, based on the first value, each of
whether to perform a first function on the data packet, and
whether to perform a second function on the data packet different from the first function; and
transmitting the data packet having the preamble from the first wireless communication device to the second wireless communication device.

12. The method of claim 11, wherein the preamble corresponds to a mixed mode preamble, and wherein transmitting the data packet having the preamble includes:
transmitting a first portion of the mixed mode preamble omnidirectionally in a single stream; and
transmitting a second portion of the mixed mode preamble in a beamformed manner in a single stream or in multiple streams.

13. The method of claim 11, wherein the first function corresponds to a beam change between a first portion of the preamble and a second portion of the preamble.

14. The method of claim 11, wherein the second function corresponds to channel smoothing.

15. The method of claim 11, wherein the first value indicates a number of streams in a portion of the preamble to be transmitted from the first wireless communication device.

16. The method of claim 15, wherein the second value indicates whether to perform the first function if the number of streams indicated by the first value is one.

17. The method of claim 16, wherein, if the number of streams indicated by the first value is one, the second value indicates a recommendation, to the second wireless communication device, to one of (i) perform the first function on the data packet and (ii) not perform the first function on the data packet.

18. The method of claim 15, wherein the second value indicates whether to perform the second function if the number of streams indicated by the second value is greater than one.

19. The method of claim 18, wherein, if the number of streams indicated by the second value is greater than one, the second value indicates a recommendation, to the second wireless communication device, to one of (i) perform the second function on the data packet and (ii) not perform the second function on the data packet.

20. The method of claim 11, further comprising, using the second wireless communication device:
receiving the data packet including the preamble from the first wireless communication device; and
determining, based on the first value in the first sub-field of the preamble, whether to (i) perform the first function on the data packet or (ii) perform the second function on the data packet.

* * * * *